United States Patent
Namba et al.

(10) Patent No.: US 11,152,633 B2
(45) Date of Patent: Oct. 19, 2021

(54) FUEL CELL SYSTEM AND METHOD OF CONTROLLING THE SAME

(71) Applicant: TOYOTA JIDOSHA KABUSHIKI KAISHA, Toyota (JP)

(72) Inventors: Ryouichi Namba, Okazaki (JP); Shuya Kawahara, Okazaki (JP); Norihiro Fukaya, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 327 days.

(21) Appl. No.: 16/276,770

(22) Filed: Feb. 15, 2019

(65) Prior Publication Data
US 2019/0273272 A1    Sep. 5, 2019

(30) Foreign Application Priority Data
Mar. 5, 2018 (JP) .............................. JP2018-038267

(51) Int. Cl.
| | | |
|---|---|---|
| *H01M 8/0438* | (2016.01) | |
| *H01M 8/04858* | (2016.01) | |
| *H01M 8/04746* | (2016.01) | |
| *H01M 16/00* | (2006.01) | |
| *F04D 27/02* | (2006.01) | |

(52) U.S. Cl.
CPC ........ *H01M 8/04395* (2013.01); *F04D 27/02* (2013.01); *H01M 8/04425* (2013.01); *H01M 8/04753* (2013.01); *H01M 8/04776* (2013.01); *H01M 8/04858* (2013.01); *H01M 16/006* (2013.01); *H01M 2250/20* (2013.01)

(58) Field of Classification Search
CPC ......... H01M 8/04858; H01M 8/04089; H01M 8/0438; Y02E 60/50; F05D 2270/301; F05D 2270/312
See application file for complete search history.

(56) References Cited

U.S. PATENT DOCUMENTS

2012/0270126 A1    10/2012  Matsumoto et al.
2016/0308228 A1*   10/2016  Takahashi ......... H01M 8/04395

FOREIGN PATENT DOCUMENTS

| JP | 2006-333602 A | 12/2006 |
| JP | 2012-227044 A | 11/2012 |

* cited by examiner

*Primary Examiner* — Ladan Mohaddes
(74) *Attorney, Agent, or Firm* — Dickinson Wright, PLLC

(57) ABSTRACT

A fuel cell system includes a control unit that is configured to perform highland control for increasing an amount of electric power generated per unit time by a fuel cell and increasing a rotational speed of a compressor such that an operating point of the compressor falls outside a surging region, in comparison with a case where a highland condition that an outside air pressure determined from an outside air pressure-associated information is lower than an outside air pressure threshold determined in advance is not fulfilled, when the highland condition is fulfilled in starting electric power generation by the fuel cell.

6 Claims, 4 Drawing Sheets

FUEL CELL SYSTEM AND METHOD OF CONTROLLING THE SAME

INCORPORATION BY REFERENCE

The disclosure of Japanese Patent Application No. 2018-038267 filed on Mar. 5, 2018 including the specification, drawings and abstract is incorporated herein by reference in its entirety.

BACKGROUND

1. Technical Field

The disclosure relates to a fuel cell system and a method of controlling the fuel cell system.

2. Description of Related Art

The outside air pressure is lower when the fuel cell system is on a highland than when the fuel cell system is on a lowland. Therefore, when the fuel cell system is on the highland, a compressor needs to be rotated at a higher speed than when the fuel cell system is on the lowland, in order to ensure that the compressor supplies a fuel cell with the same amount of cathode gas as in the case where the fuel cell system is on the lowland. In Japanese Patent Application Publication No. 2012-227044 (JP 2012-227044 A), there is described a method in which an upper limit is provided for a rotational speed of a compressor when a fuel cell system is on a highland, so as to restrain noise and vibration from being caused due to high-speed rotation of the compressor.

SUMMARY

However, the inventors have found out that the compressor may malfunction due to the occurrence of surging and the charging of a secondary battery may be impossible when electric power generation by a fuel cell is started to charge the secondary battery in the case where the fuel cell system is on the highland. It should be noted herein that surging is a phenomenon that makes it impossible for the compressor to supply cathode gas normally on a specific condition. Therefore, there has been desired an art capable of reliably charging the secondary battery even when the fuel cell system is on the highland.

The disclosure can be realized in the following modes.

A first aspect of the disclosure is a fuel cell system. The fuel cell system includes a fuel cell that is configured to generate electric power through an electrochemical reaction between anode gas and cathode gas, an outside air pressure acquisition unit that is configured to acquire outside air pressure-associated information that is associated with an outside air pressure, a cathode gas supply flow passage that is configured to supply the cathode gas to the fuel cell, a compressor that is provided in the cathode gas supply flow passage and that is configured to deliver outside air to the fuel cell and operate through use of electric power output by the fuel cell, and a control unit that is configured to perform control of the fuel cell system. The control unit is configured to perform highland control for increasing an amount of electric power generated per unit time by the fuel cell and increasing a rotational speed of the compressor such that an operating point of the compressor falls outside a surging region, in comparison with a case where a highland condition that the outside air pressure determined from the outside air pressure-associated information is lower than an outside air pressure threshold determined in advance is not fulfilled, when the highland condition is fulfilled in starting electric power generation by the fuel cell. According to the fuel cell system of this mode, the compressor is normally operated outside the surging region, by performing highland control when the outside air pressure is lower than the outside air pressure threshold and the fuel cell system is estimated to be in operation on a highland. As a result, a secondary battery can be reliably charged.

In the first aspect, the fuel cell system may include a secondary battery. The control unit may be configured to perform highland control for increasing the amount of electric power generated by the fuel cell, increasing the rotational speed of the compressor such that the operating point of the compressor falls outside the surging region, and charging the secondary battery, in comparison with the case where the highland condition is not fulfilled, when the highland condition is fulfilled in starting electric power generation by the fuel cell to charge the secondary battery.

In the fuel cell system according to the first aspect, the control unit may increase the amount of electric power generated per unit time by the fuel cell as the outside air pressure falls in the highland control. According to the fuel cell system of this mode, the noise and vibration of the compressor at the time of electric power generation can be restrained from being caused.

A second aspect of the disclosure is a method of controlling a fuel cell system that is equipped with a fuel cell, and a compressor that supplies cathode gas to the fuel cell. The method includes performing highland control for increasing an amount of electric power generated per unit time by the fuel cell and increasing a rotational speed of the compressor such that an operating point of the compressor falls outside a surging region, in comparison with a case where a highland condition that an outside air pressure is lower than an outside air pressure threshold determined in advance is not fulfilled, when the highland condition is fulfilled in starting electric power generation by the fuel cell.

In the second aspect of the disclosure, the fuel cell system may include a secondary battery. The Performing of the highland control may include increasing the amount of electric power generated per unit time by the fuel cell, increasing the rotational speed of the compressor such that the operating point of the compressor falls outside the surging region, and charging the secondary battery, in comparison with the case where the highland condition is not fulfilled, when the highland condition is fulfilled in starting electric power generation by the fuel cell to charge the secondary battery.

The disclosure can be realized in various modes. For example, the disclosure can be realized in modes such as a method of controlling a fuel cell system or the like.

BRIEF DESCRIPTION OF THE DRAWINGS

Features, advantages, and technical and industrial significance of an exemplary embodiment of the disclosure will be described below with reference to the accompanying drawings, in which like numerals denote like elements, and wherein.

DETAILED DESCRIPTION OF EMBODIMENT

A. First Embodiment

Figure 1:
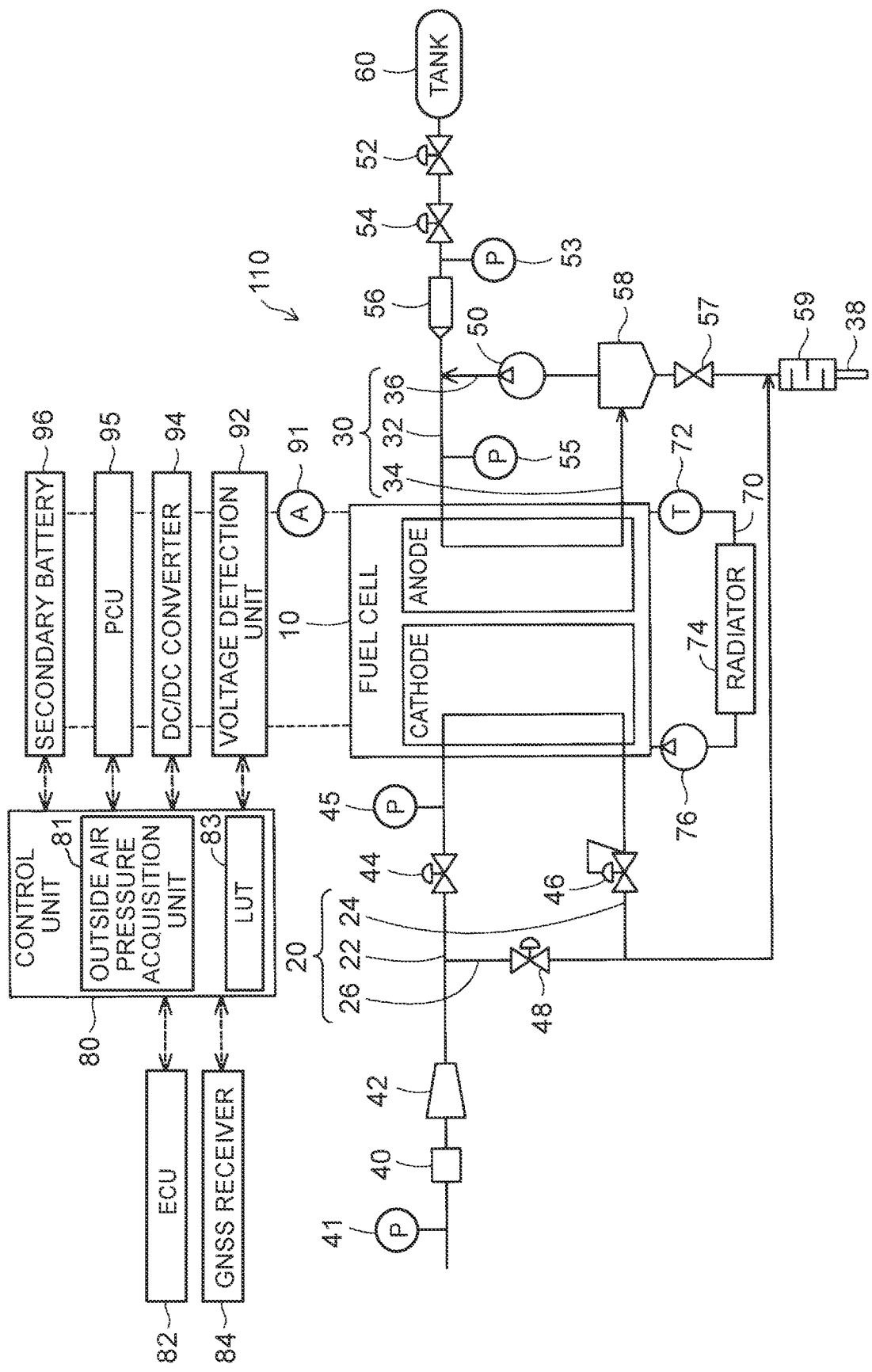
FIG. 1 is a schematic view showing the configuration of a fuel cell system according to the first embodiment.

FIG. 1 is a schematic view showing the configuration of a fuel cell system 110 according to the first embodiment. The fuel cell system 110 is equipped with a fuel cell stack (hereinafter referred to simply as "a fuel cell") 10, a cathode gas flow passage 20, an anode gas flow passage 30, a cooling flow passage 70, and a control unit 80. In the present embodiment, the fuel cell system 110 is mounted in a vehicle.

The fuel cell 10 is configured by stacking electric power generation modules each of which is equipped with a membrane electrode assembly (an MEA) that is obtained by joining both electrodes, namely, an anode and a cathode to both sides of an electrolyte membrane. The fuel cell 10 generates electric power through an electrochemical reaction between hydrogen gas as anode gas supplied from an anode gas tank 60 and oxygen in the atmosphere as cathode gas. Incidentally, for example, alcohol or hydrocarbons may be used as anode gas, instead of hydrogen gas.

The cathode gas flow passage 20 is a flow passage through which cathode gas is supplied to and discharged from the fuel cell 10. The cathode gas flow passage 20 is equipped with a cathode gas supply flow passage 22 through which cathode gas is supplied to the fuel cell 10, a cathode gas discharge flow passage 24 through which cathode gas is discharged from the fuel cell 10, and a bypass flow passage 26 that establishes communication between the cathode gas supply flow passage 22 and the cathode gas discharge flow passage 24.

The cathode gas supply flow passage 22 is provided, sequentially from an upstream side thereof, with an outside air pressure gauge 41, a flowmeter 40, a compressor 42, a supply valve 44, and a pressure gauge 45. The outside air pressure gauge 41 is an instrument that measures an outside air pressure. The flowmeter 40 is an instrument that measures a flow rate of cathode gas introduced into the fuel cell system 110. The compressor 42 is an instrument that can operate through the use of electric power output by the fuel cell 10 and that delivers outside air to the fuel cell 10. In the present embodiment, a turbo compressor is employed as the compressor 42, but the disclosure is not limited thereto. For example, a roots compressor may be employed as the compressor 42. The supply valve 44 is a valve that controls the presence/absence of cathode gas flowing into the fuel cell 10 from the compressor 42, and is provided in the cathode gas supply flow passage 22 downstream of a portion thereof that is connected to the bypass flow passage 26. The pressure gauge 45 is an instrument that measures a pressure at a cathode gas inlet of the fuel cell 10. In the present embodiment, the pressure gauge 45 measures a pressure at the cathode gas inlet of the fuel cell 10, but the disclosure is not limited thereto. For example, a pressure at a cathode gas outlet of the fuel cell 10 may be measured by providing the pressure gauge 45 in the cathode gas discharge flow passage 24.

A pressure adjusting valve 46 that adjusts the pressure of cathode gas on a cathode outlet side of the fuel cell 10 is provided in the cathode gas discharge flow passage 24 upstream of a portion thereof that is connected to the bypass flow passage 26. A bypass valve 48 that adjusts the flow rate of cathode gas in the bypass flow passage 26 is provided in the bypass flow passage 26. In the present embodiment, the bypass flow passage 26 is a flow passage that links a portion of the cathode gas supply flow passage 22 between the compressor 42 and the supply valve 44 with a portion of the cathode gas discharge flow passage 24 downstream of the pressure adjusting valve 46.

The anode gas flow passage 30 is a flow passage through which anode gas is supplied to and discharged from the fuel cell 10. The anode gas flow passage 30 is equipped with an anode gas supply flow passage 32 through which anode gas is supplied to the fuel cell 10, an anode gas discharge flow passage 34 through which anode gas is discharged from the fuel cell 10, and an anode gas circulation flow passage 36 that establishes communication between the anode gas supply flow passage 32 and the anode gas discharge flow passage 34.

The anode gas supply flow passage 32 is connected to the anode gas tank 60. The anode gas supply flow passage 32 is provided, from an upstream side thereof, with an open/close valve 52, a regulator 54, an upstream-side pressure measurement unit 53, an injector 56, and a pressure measurement unit 55. The open/close valve 52 is a valve that controls the presence/absence of anode gas flowing into the upstream side of the injector 56 from the anode gas tank 60. The regulator 54 is a valve for adjusting the pressure of anode gas upstream of the injector 56. The injector 56 is a valve that controls the inflow of anode gas into the fuel cell 10. In the present embodiment, the injector 56 is provided in the anode gas supply flow passage 32 upstream of a region thereof that communicates with the anode gas circulation flow passage 36. The upstream-side pressure measurement unit 53 is an instrument that measures a pressure at an inlet of the injector 56. The pressure measurement unit 55 is an instrument that measures a pressure at an anode gas inlet of the fuel cell 10. In the present embodiment, the pressure measurement unit 55 is provided in the anode gas supply flow passage 32 downstream of a portion thereof that is linked with the anode gas circulation flow passage 36.

The anode gas discharge flow passage 34 is connected to a gas-liquid separator 58. The anode gas discharge flow passage 34 guides unreacted gases (anode gas, nitrogen gas and the like) that have not been used for the electrochemical reaction in the fuel cell 10, and the water produced in the fuel cell 10 to the gas-liquid separator 58.

The gas-liquid separator 58 separates the gas and liquid discharged from the anode of the fuel cell 10 from each other. The gas-liquid separator 58 is connected to the anode gas circulation flow passage 36 and a discharge pipe 38. The gas-liquid separator 58 guides the unreacted anode gas that has not been used for the electrochemical reaction in the fuel cell 10 to the anode gas circulation flow passage 36, and guides the water and nitrogen gas produced in the fuel cell 10 to the discharge pipe 38.

A pump 50 is provided in the anode gas circulation flow passage 36. The pump 50 delivers the gases including the anode gas separated by the gas-liquid separator 58 to the anode gas supply flow passage 32. The fuel cell system 110 enhances the utilization efficiency of anode gas by circulating anode gas and supplying this anode gas again to the fuel cell 10.

The discharge pipe 38 is a pipeline for discharging the liquid and gas separated from each other by the gas-liquid separator 58 to the outside of the fuel cell system 110. The discharge pipe 38 is provided, sequentially from an upstream side thereof, with an exhaust drainage valve 57 that discharges gas and that drains water, and a silencer 59 that reduces the noise produced in discharging gas and draining water.

The cooling flow passage 70 is a flow passage for cooling the fuel cell 10, and is a flow passage that links a radiator 74 for cooling a cooling medium in the cooling flow passage 70 with a cooling medium flow passage in the fuel cell 10. A temperature measurement unit 72 is provided in the cooling flow passage 70 upstream of the radiator 74. A pump 76 is provided in the cooling flow passage 70 downstream of the radiator 74. In the present embodiment, the temperature of the fuel cell 10 can be measured by the temperature measurement unit 72.

The DC/DC converter 94 steps up an output voltage of the fuel cell 10, supplies the stepped-up output voltage to a PCU 95, and is also connected to a secondary battery 96. The electric power generated by the fuel cell 10 is supplied to a load such as a drive motor for driving wheels, or the like, the above-mentioned compressor 42, the above-mentioned pump 50, and various valves via an electric power supply circuit including the PCU 95. The PCU 95 limits the current of the fuel cell 10 through the control by the control unit 80. Incidentally, a current measurement unit 91 that measures a current of the fuel cell 10, and a voltage measurement unit 92 that measures a voltage of the fuel cell 10 are provided between the fuel cell 10 and the DC/DC converter 94.

The control unit 80 is configured as a computer that is equipped with a CPU, a memory, and an input/output interface circuit to which components including sensors such as the above-mentioned outside air pressure gauge 41 and the like, actuators such as the compressor 42 and the like are connected. The control unit 80 outputs a signal for controlling the activation and stop of the components in the fuel cell system 110 in accordance with a command of an electronic control unit (an ECU) 82. The ECU 82 is a control unit that controls the entire vehicle including the fuel cell system 110. For example, the ECU 82 performs the control of the vehicle in accordance with a depression amount of an accelerator pedal, a depression amount of a brake pedal, a vehicle speed and the like. Incidentally, the ECU 82 may be included in part of the function of the control unit 80. The CPU performs the control of electric power generation by the fuel cell system 110, by executing a control program stored in the memory. Besides, in the present embodiment, the control unit 80 is connected to a GNSS receiver 84 that receives global navigation satellite system (GNSS) information, but the disclosure is not limited thereto. The control unit 80 may not be connected to the GNSS receiver 84.

In the present embodiment, when a highland condition determined in advance is fulfilled, the control unit 80 increases the flow rate of cathode gas supplied to the fuel cell 10 (hereinafter referred to also as "the cathode gas supply flow rate") by increasing the rotational speed of the compressor 42 such that the operating point of the compressor 42 falls outside the surging region. A relationship between surging and the cathode gas supply flow rate will be described hereinafter.

Figure 2:
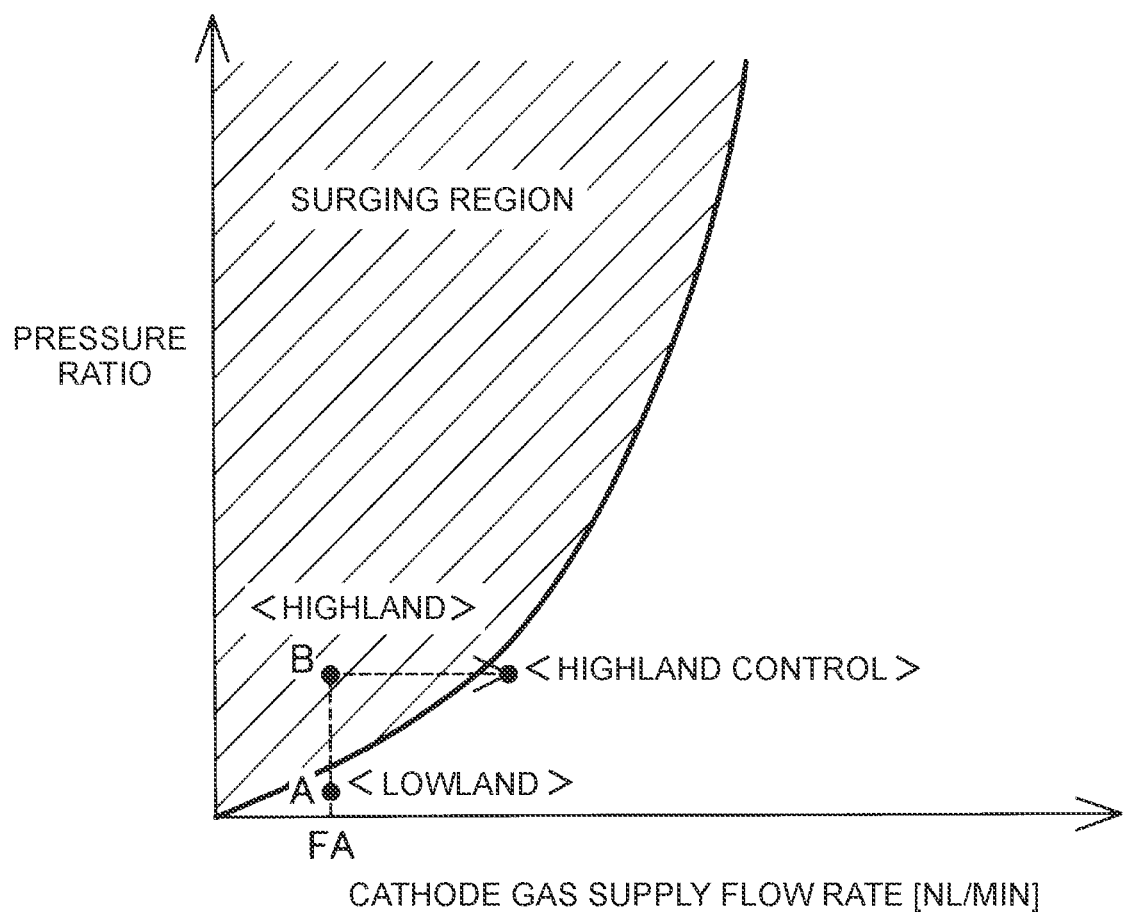
FIG. 2 is a view showing a relationship between a pressure ratio and a cathode gas supply flow rate.

FIG. 2 is a view showing a relationship between the pressure ratio and the cathode gas supply flow rate (NL/minute). The pressure ratio is a value obtained by dividing an outlet pressure of the compressor 42 by an inlet pressure thereof. The inlet pressure can be regarded as equal to the outside air pressure. Therefore, in the case where the outlet pressure of the compressor 42 remains the same, the pressure ratio increases as the outside air pressure decreases.

It should be noted herein that the compressor 42 is assumed to supply cathode gas to the fuel cell 10 at a cathode gas flow rate FA so as to generate electric power by the fuel cell 10. At this time, in the case where the fuel cell system 110 is on a lowland, the outside air pressure is higher and hence the pressure ratio is smaller than in the case where the fuel cell system 110 is on a highland. As a result, even when the control unit 80 does not correct the cathode gas supply flow rate in particular, an operating point A of the compressor 42 falls outside the surging region. It should be noted herein that the surging region means a region where surging occurs in the compressor 42 due to the presence of the pressure ratio and the cathode gas supply flow rate within specific ranges respectively. When surging occurs, part of the energy consumed by the compressor 42 is consumed by noise and vibration. As a result, the compressor 42 cannot supply cathode gas normally.

On the other hand, in the case where the fuel cell system 110 is on the highland, the outside air pressure is lower and hence the pressure ratio is larger than in the case where the fuel cell system 110 is on the lowland. As a result, an operating point B of the compressor 42 may fall within the surging region unless the control unit 80 corrects the cathode gas supply flow rate.

In the present embodiment, in such a case, the control unit 80 increases the rotational speed of the compressor 42 such that the operating point of the compressor 42 falls outside the surging region, and increases the cathode supply flow rate. Thus, in the present embodiment, the occurrence of surging can be suppressed, so the compressor 42 can be normally operated. As a result, the secondary battery 96 can be reliably charged.

Figure 3:
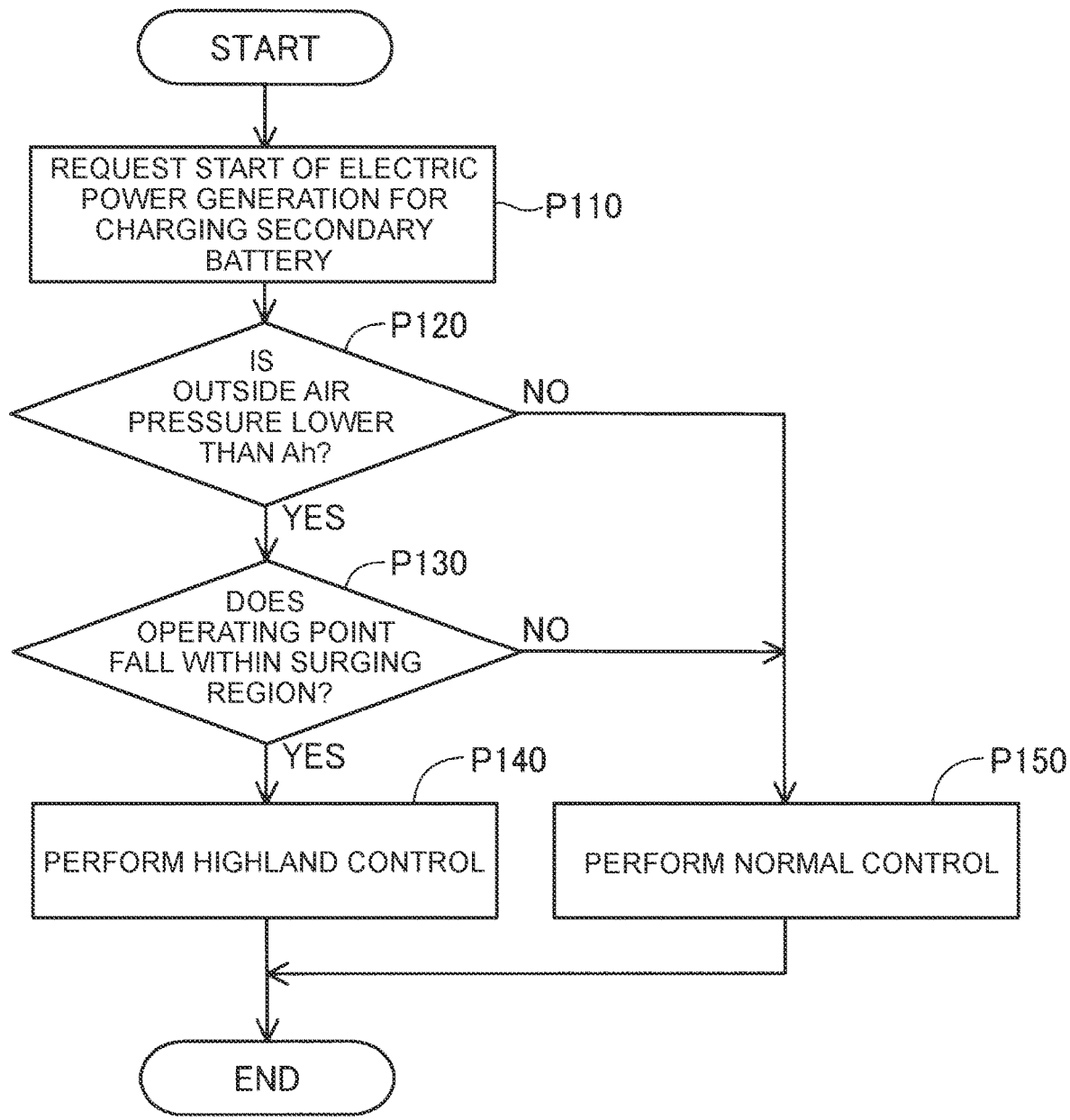
FIG. 3 is a flowchart for illustrating highland control.

FIG. 3 is a flowchart for illustrating highland control that is performed by the control unit 80. This process is performed when electric power generation by the fuel cell 10 is started to charge the secondary battery.

When the ECU 82 requests the control unit 80 to start electric power generation by the fuel cell 10 to charge the secondary battery 96 (process P110), the control unit 80 determines whether or not the outside air pressure is lower than an outside air pressure threshold Ah determined in advance (process P120). The control unit 80 is equipped with an outside air pressure acquisition unit 81 that acquires outside air pressure-associated information that is associated with the outside air pressure. In the present embodiment, the outside air pressure acquisition unit 81 acquires the outside air pressure measured by the outside air pressure gauge 41, as the outside air pressure-associated information that is associated with the outside air pressure, but the disclosure is not limited thereto. For example, the outside air pressure acquisition unit 81 may store in advance a lookup table that associates a position with the outside air pressure at the position, determine a position where the fuel cell system 110 exists from the GNSS information acquired from the GNSS receiver 84, and acquire an outside air pressure at the position through the use of this lookup table. In the present embodiment, the outside air pressure threshold Ah is equal to the standard atmospheric pressure (1 atm), but the disclosure is not limited thereto. For example, the outside air pressure threshold Ah may be equal to 0.9 atm or 0.8 atm. In other words, the outside air pressure threshold Ah is preferably equal to a value obtained by multiplying the standard atmospheric pressure by a coefficient equal to or smaller than 1, and this coefficient is preferably set to a value smaller than 1.

If the control unit 80 determines that the outside air pressure is lower than the outside air pressure threshold Ah (YES in process P120), the control unit 80 determines whether or not the operating point of the compressor 42 falls within the surging region (process P130). In the present embodiment, the operating point of the compressor 42 is determined by the pressure ratio of the compressor 42 and the cathode gas supply flow rate. Therefore, in the present embodiment, the control unit 80 determines, in the following manner, whether or not the operating point of the compressor 42 falls within the surging region.

In the present embodiment, the pressure ratio of the compressor 42 is determined from the outside air pressure, because the pressure in the fuel cell 10 is considered to be constant. Besides, in the present embodiment, the cathode gas supply flow rate in starting electric power generation by the fuel cell 10 to charge the secondary battery 96 is determined in advance. Moreover, in the present embodiment, the control unit 80 stores in advance a lookup table 83 that associates the pressure ratio and rotational speed of the compressor 42, the cathode gas supply flow rate, and the surging region with one another. Therefore, the control unit 80 determines, through the use of the outside air pressure and the lookup table 83, whether or not the operating point of the compressor 42 falls within the surging region, but the disclosure is not limited thereto. For example, the pressure in the fuel cell 10 may be the pressure value measured by the pressure gauge 45, and the pressure ratio may be determined from this pressure value and the outside air pressure.

If the control unit 80 determines that the operating point of the compressor 42 falls within the surging region (YES in process P130), the control unit 80 performs highland control. In concrete terms, as highland control, the control unit 80 increases the amount of electric power generated per unit time by the fuel cell 10, increases the rotational speed of the compressor 42 such that the operating point of the compressor 42 falls outside the surging region, and charges the secondary battery 96 (process P140). The amount of electric power generated by the fuel cell 10 is increased because the fuel cell 10 supplies the consumed electric power of the compressor 42 increased by increasing the rotational speed of the compressor 42. Then, the flow is ended as soon as the process P140 is ended. In the present embodiment, the control unit 80 ends highland control (process P140) upon the completion of the charging of the secondary battery 96, but the disclosure is not limited thereto. For example, the control unit 80 may periodically (e.g., every minute) acquire the outside air pressure-associated information, make a return to the operating point of the compressor 42 in the case where highland control is not performed if it is determined that the outside air pressure determined from the outside air pressure-associated information is equal to or higher than the outside air pressure threshold Ah, and charge the secondary battery 96.

Figure 4:
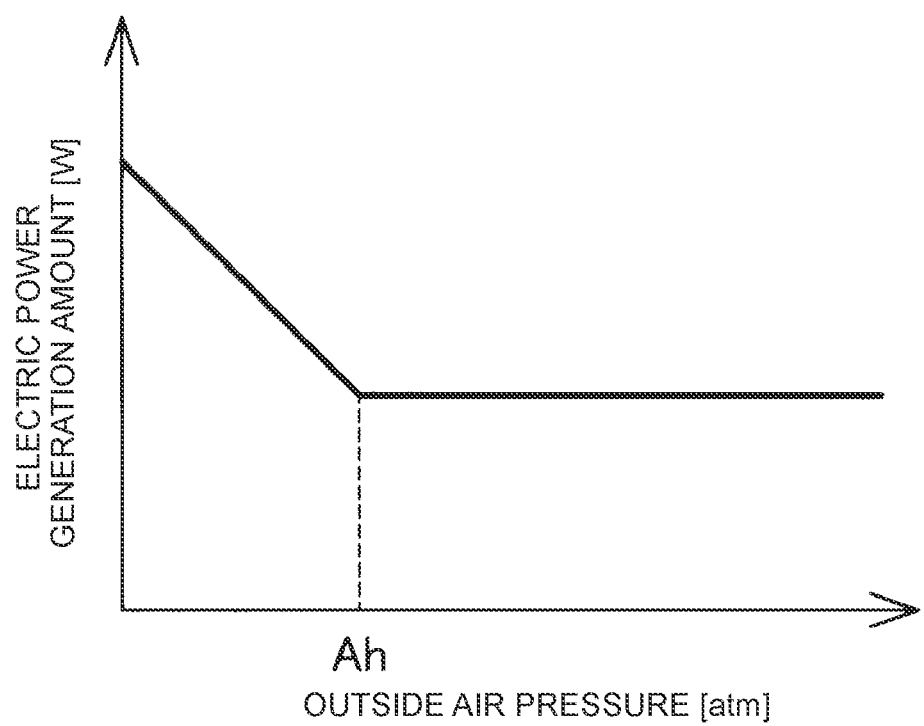
FIG. 4 is a view showing a relationship between an outside air pressure and an electric power generation amount of a fuel cell at the time of highland control.

FIG. 4 is a view showing a relationship between the outside air pressure (atm) and the amount (kw) of electric power generated per unit time by the fuel cell 10 at the time of highland control. In the present embodiment, the amount of electric power generated per unit time by the fuel cell 10 is increased as the outside air pressure falls in highland control. In general, as the amount of electric power generated per unit time by the fuel cell 10 increases, the rotational speed of the compressor 42 increases, and the noise and vibration caused by the compressor 42 increase. Therefore, in this manner, the noise and vibration of the compressor 42 at the time of electric power generation can be more restrained from being caused than in the case where the amount of electric power generated per unit time by the fuel cell 10 at the time of highland control is constant as an amount of electric power generation that is needed when the outside air pressure is extremely low. Incidentally, the disclosure is not limited to this case. For example, the amount of electric power generated per unit time by the fuel cell 10 at the time of highland control may be constant regardless of the outside air pressure.

On the other hand, if the control unit 80 determines that the outside air pressure is equal to or higher than the outside air pressure threshold Ah (NO in process P120 (see FIG. 3)) or if the control unit 80 determines that the operating point of the compressor 42 falls outside the surging region (NO in process P130), the control unit 80 performs normal control (process P150). In concrete terms, the control unit 80 supplies cathode gas to the fuel cell 10 by the compressor 42, and causes the fuel cell 10 to generate electric power to charge the secondary battery 96, without changing the operating point of the compressor 42, as normal control. Then, the flow is ended as soon as normal control (process P150) is ended. In the present embodiment, the control unit 80 ends normal control (process P150) upon the completion of the charging of the secondary battery 96.

In the present embodiment, in the case where a highland condition that the outside air pressure is lower than the outside air pressure threshold Ah is fulfilled, the control unit 80 performs highland control in comparison with the case where the highland condition is not fulfilled. That is, in the case where the highland condition is fulfilled, the control unit 80 increases the amount of electric power generated per unit time by the fuel cell 10, increases the rotational speed of the compressor 42 such that the operating point of the compressor 42 falls outside the surging region, and charges the secondary battery 96, in comparison with the case where the highland condition is not fulfilled. Thus, according to the present embodiment, when the outside air pressure is lower than the outside air pressure threshold and the fuel cell system 110 is estimated to be in operation on the highland, the compressor is normally operated outside the surging region. As a result, the secondary battery 96 can be reliably charged. Incidentally, in the present embodiment, the process P130 is provided, but the disclosure is not limited thereto. The process P130 may not be provided. That is, if the control unit 80 determines that the outside air pressure is lower than the outside air pressure threshold Ah (YES in process P120), the control unit 80 may perform highland control (process P140) regardless of whether or not the operating point of the compressor 42 falls within the surging region.

The disclosure is not limited to the above-mentioned embodiment, but can be realized in various configurations within such a range as not to depart from the gist thereof. For example, the technical features in the embodiment corresponding to the technical features in the respective aspects described in the section of the summary of the disclosure can be appropriately replaced or combined with one another to partially or entirely solve the above-mentioned problem or partially or entirely achieve the above-mentioned effect. Besides, the technical features can be appropriately deleted unless they are described as being indispensable in the present specification.

What is claimed is:

1. A fuel cell system comprising:
   a fuel cell that is configured to generate electric power through an electrochemical reaction between anode gas and cathode gas;
   an outside air pressure acquisition unit that is configured to acquire outside air pressure-associated information that is associated with an outside air pressure;
   a cathode gas supply flow passage that is configured to supply the cathode gas to the fuel cell;

a compressor that is provided in the cathode gas supply flow passage and that is configured to deliver outside air to the fuel cell and operate through use of electric power output by the fuel cell; and a control unit that is programmed to
- (i) determine whether a highland condition that the outside air pressure determined from the outside air pressure-associated information is lower than an outside air pressure threshold determined in advance is fulfilled or not, and
- (ii) perform control of the fuel cell system, wherein the control unit is programmed to perform highland control for increasing an amount of electric power generated per unit time by the fuel cell and increasing a rotational speed of the compressor such that an operating point of the compressor falls outside a surging region, when it is determined that the highland condition is fulfilled, in starting electric power generation by the fuel cell.

2. The fuel cell system according to claim 1, further comprising:

a secondary battery, wherein the control unit is programmed to perform highland control for increasing the amount of electric power generated by the fuel cell, increasing the rotational speed of the compressor such that the operating point of the compressor falls outside the surging region, and charging the secondary battery, in comparison with the case where the highland condition is not fulfilled, when the highland condition is fulfilled in starting electric power generation by the fuel cell to charge the secondary battery.

3. The fuel cell system according to claim 2, wherein
the control unit is programmed to increase the amount of electric power generated per unit time by the fuel cell as the outside air pressure falls in the highland control.

4. A method of controlling a fuel cell system that is equipped with a fuel cell, and a compressor that supplies cathode gas to the fuel cell, comprising:

acquiring outside air pressure-associated information that is associated with an outside air pressure;

determining whether a highland condition that an outside air pressure is lower than an outside air pressure threshold determined in advance is fulfilled or not, in starting electric power generation by the fuel cell; and performing highland control for increasing an amount of electric power generated per unit time by the fuel cell and increasing a rotational speed of the compressor such that an operating point of the compressor falls outside a surging region, when it is determined that the highland condition is fulfilled.

5. The method of controlling the fuel cell system according to claim 4, wherein the fuel cell system includes a secondary battery, and the performing of the highland control includes increasing the amount of electric power generated per unit time by the fuel cell, increasing the rotational speed of the compressor such that the operating point of the compressor falls outside the surging region, and charging the secondary battery, in comparison with the case where the highland condition is not fulfilled, when the highland condition is fulfilled in starting electric power generation by the fuel cell to charge the secondary battery.

6. The method of controlling the fuel cell system according to claim 4, further comprising the steps of:

determining whether or not the operating point of the compressor falls within the surging region, when the outside air pressure is lower than the outside air pressure threshold; and performing the highland control when it is determined that the operating point of the compressor falls within the surging region.

\* \* \* \* \*